United States Patent
Gupta et al.

(10) Patent No.: US 7,598,195 B2
(45) Date of Patent: Oct. 6, 2009

(54) FUSION-CAST REFRACTORY WITH HIGH ELECTRICAL RESISTIVITY

(75) Inventors: Amul Gupta, Jamestown, NY (US); Stephen M. Winder, Grand Island, NY (US)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 223 days.

(21) Appl. No.: 10/585,165

(22) PCT Filed: Dec. 30, 2004

(86) PCT No.: PCT/US2004/044042

§ 371 (c)(1),
(2), (4) Date: Jun. 14, 2007

(87) PCT Pub. No.: WO2005/068393

PCT Pub. Date: Jul. 28, 2005

(65) Prior Publication Data

US 2007/0249481 A1 Oct. 25, 2007

Related U.S. Application Data

(60) Provisional application No. 60/533,990, filed on Jan. 2, 2004.

(51) Int. Cl.
*C04B 35/109* (2006.01)
*C04B 35/484* (2006.01)

(52) U.S. Cl. ..................... 501/105; 501/107
(58) Field of Classification Search .............. 501/105, 501/107
See application file for complete search history.

(56) References Cited

U.S. PATENT DOCUMENTS

| 4,336,339 A | 6/1982 | Okumiya et al. |
| 4,705,763 A | 11/1987 | Hayashi |
| 5,023,218 A * | 6/1991 | Zanoli et al. ............... 501/105 |
| 5,086,020 A | 2/1992 | Ishino et al. |
| 5,344,801 A | 9/1994 | Kida et al. |
| 5,466,643 A | 11/1995 | Ishino |
| 5,679,612 A | 10/1997 | Endo |

FOREIGN PATENT DOCUMENTS

| JP | 48080610 | * 10/1973 |
| JP | 4193776 A | 7/1992 |
| JP | 6287059 A | 10/1994 |
| JP | 8048573 A | 2/1996 |
| JP | 8277162 A | 10/1996 |

\* cited by examiner

*Primary Examiner*—Karl E Group
(74) *Attorney, Agent, or Firm*—Christopher L. Parmelee; Walker & Jocke

(57) ABSTRACT

A fusion-cast refractory is provided. The refractory comprises 0.8% to 2.5% $Al_2O_3$, 4.0% to 10.0% $SiO_2$, 86% to 95% $ZrO_2$, 0.1% to 1.2% $B_2O_3$, up to 0.04% $Na_2O$, up to 0.4% CaO, up to 0.1% $Fe_2O_3$ and up to 0.25% $TiO_2$.

9 Claims, No Drawings

FUSION-CAST REFRACTORY WITH HIGH ELECTRICAL RESISTIVITY

CROSS-REFERENCE TO RELATED APPLICATIONS

This application claims the benefit under 35 U.S.C. §120 of the filing date of U.S. Provisional Application No. 60/533,990 filed Jan. 2, 2004.

FIELD OF THE INVENTION

The present invention relates to fusion-cast zirconia materials, and in particular, to a fusion-cast zirconia refractory having high electrical resistivity suitable for use in glass-melting furnaces.

DESCRIPTION OF THE RELATED ART

Fused refractories comprising primarily $ZrO_2$ ("zirconia") are traditionally used in glass melting furnaces. The zirconia provides excellent corrosion resistance to the molten glass. Refractories utilizing $Al_2O_3$—$ZrO_2$—$SiO_2$, known as AZS refractories are well known in the art. Such refractories that have a $ZrO_2$ concentration of 80 wt % or higher are referred to as high-zirconia fused refractories.

It is desirable, especially in the production of high-quality glasses, such as TFT-LCD glass and plasma display panels, that the refractory used in the glass melting furnace have high electrical resistivity. It is also generally desirable that the refractory provides superior resistance to corrosion and thermal cycling.

High-zirconia fused refractories have been disclosed, for example, in U.S. Pat. No. 5,466,643 to Ishino, et al. (the "643 patent") and U.S. Pat. No. 5,679,612 to Endo, et al. (the "612 patent"), the entire contents of both of which are hereby incorporated by reference.

The '643 patent discloses a fused zirconia refractory that utilizes 0.05 to 1.0% of $P_2O_5$ in order to soften the matrix glass. Though this refractory exhibits an acceptable level of electrical resistance, its main objective was to improve the thermal cycling resistance and it does so by increasing the total amount of the glassy phase, which may decrease the corrosion resistance of the refractory.

The '612 patent discloses a fused zirconia refractory that eliminates the use of $P_2O_5$, but adds in 0.05 to 3% of BaO, SrO and MgO in total, in order to reduce the stresses on the glassy phase of the refractory that are caused by the elimination of $P_2O_5$. The '612 patent further discloses the use of $Na_2O$ (in an amount greater than 0.05%) and $K_2O$ to reduce the tensile stress that is caused by the addition of the alkaline earth metal oxides listed above. The presence of $Na_2O$ and $K_2O$, in dissimilar amounts, may not provide the most optimized electrical resistance in the refractory.

Therefore, the present invention seeks to achieve high electrical resistance in the fused Zirconia refractory, while minimizing the concentration of BaO, SrO, MgO, CaO, $P_2O_5$, $Na_2O$ and $K_2O$.

SUMMARY OF THE INVENTION

In order to achieve the listed objectives, a fusion-cast refractory is provided. The refractory comprises 0.8% to 2.5% $Al_2O_3$, 4.0% to 10.0% $SiO_2$, 86% to 95% $ZrO_2$, 0.1% to 1.2% $B_2O_3$, up to 0.04% $Na_2O$, up to 0.4% CaO, up to 0.1% $Fe_2O_3$ and up to 0.25% $TiO_2$.

DETAILED DESCRIPTION OF THE PREFERRED EMBODIMENTS

Except where otherwise noted, all percentages listed below, including in any claims, are on a weight basis and are a percentage of the fusion-cast refractory as measured from the pourstream. The present invention is a fusion-cast refractory comprising 0.8% to 2.5% $Al_2O_3$, 4.0% to 10.0% $SiO_2$, 86% to 95% $ZrO_2$, 0.1% to 1.2% $B_2O_3$, up to 0.04% $Na_2$, up to 0.4% CaO, up to 0.1% $Fe_2O_3$ and up to 0.25% $TiO_2$. Refractories made in accordance with the present invention are characterized by an electrical resistivity of at least 80 ohm-cm at 1625° C. It is recognized that refractories with lower $ZrO_2$ content and higher glass content can also be manufactured but that their utility is limited.

In a preferred embodiment, the present invention is a fusion-cast refractory comprising 0.9% to 2.0% $Al_2O_3$, 6.0% to 8.0% $SiO_2$, 88% to 92% $ZrO_2$, 0.3% to 0.9% $B_2O_3$, up to 0.04% $Na_2O$, up to 0.2% CaO, up to 0.05% $Fe_2O_3$ and up to 0.15% $TiO_2$.

The $ZrO_2$ content of the refractory according to the invention is 86 to 94%, and preferably is 88 to 94%. $ZrO_2$ content higher than 94% does not offer crack-free refractories, while $ZrO_2$ content lower than 86% leads to poor resistance to molten glass.

The $SiO_2$ content of the refractory according to the invention is 4 to 10%, or preferably 6 to 8%. The glass phase cannot be formed as a continuous matrix phase at a content of less than 4%, while poor resistance to molten glass may be expected at a content of higher than 10%.

The $Al_2O_3$ content of the refractory according to the present invention is 0.8 to 2.5%, and preferably 0.9 to 2.0%. $Al_2O_3$ improves the flowability of the melt at a content higher than 0.8%, but content higher than 2.5% leads to instability of the glass phase, rendering the product prone to failure.

The $B_2O_3$ content of the refractory according to the present invention is 0.1 to 1.2%, and is preferably 0.3 to 0.9%. The addition of $B_2O_3$ aids in suppressing cracks in the refractory during fabrication. This benefit is not realized at a content of less than 0.1%, and concentrations over 1.2% can cause an anomalous behavior of the glassy phase.

CaO is an optional component of the refractory according to the present invention, and is present in an amount from 0.0 to 0.4% of the refractory. The CaO may be added in order to help reduce the stresses in the refractory and to reduce cracking during fabrication. The addition of CaO is also beneficial when the refractory of the present invention is used in a glass melting furnace where TFT-LCD glass or plasma display panels are formed, as those molten glasses may also contain CaO.

$Na_2O$ and $K_2O$ are also optional components of the refractory according to the present invention, present in an amount from 0.0 to 0.04% of the refractory. The alkali is a preferably eliminated from the refractory, as it is the major source of electrical conduction in the glass.

$TiO_{and\ Fe2}O_3$ may be present as impurities, but their individual concentrations should not exceed 0.25% for the $TiO_2$, 0.1% for the $Fe_2O_3$, and the total concentration should not exceed 0.35% because they may encourage defect forming potential of the refractory.

Examples

The raw materials include zirconia (derived from zircon sand by removing most of its silica), zircon sand, calcined alumina, boric oxide, calcium carbonate, and dead-burned magnesia. These raw materials are selected such that the impurities (such as $Fe_2O_3$, $TiO_2$, $Na_2O$, $K_2O$) are reduced to a minimum level. The raw materials were carefully weighed and blended into a homogeneous mixture, and subsequently discharged into a large steel crucible for melting. The steel crucible was powered by graphite electrodes using 3 phase current supply. The outside of crucible was cooled by water continuously during the operation.

The raw materials were melted for one hour and the liquid was poured into a graphite mold. During normal production, this batch process is repeated every hour, 24 hours a day, and up to 7 days a week. The graphite mold was surrounded by calcined alumina powder in a large steel container (known as a bin). After the mold was filled completely, the top of the mold was covered with calcined alumina powder and the bin was stored inside the building for a period of at least 2 weeks to allow the casting to cool slowly. This is important to ensure that the casting is recovered with minimal to no cracking.

While filling the mold, during pouring of the liquid from the crucible, a small sample of the liquid is collected in a graphite container. The liquid in this container is allowed to cool rapidly. The resulting sample is tested for chemistry using an X-ray Fluorescence Spectrometer. All but one constituents of the zirconia refractory can be analyzed quantitatively using the X-ray Fluorescence Spectrometer. $B_2O_3$ is analyzed using either Inductively Coupled Plasma Spectrometer (ICP) or DC Arc Emission method. The chemistries of the various samples are listed in the table below.

The density may be obtained from a small cylindrical core sample, about 25 mm in diameter and 100 mm long, using Archimedes Water Immersion method, or by weighing the complete casting (after it has been machined to remove the mold skin) and dividing the weight by the casting's external volume.

The electrical resistivity was measured on a cylindrical sample, 25 mm in diameter and 50 mm long, using a 4-point electrode assembly. The ends of the sample are coated with platinum ink. Platinum ink was also placed on the circumference of the sample at two places, 25 mm apart and 12.5 mm from each end. Platinum wire was then wrapped around under each end of the sample, as well as on the two internal places mentioned above. Current was applied along the ends and voltage drop is measured across the 25 mm band in the gauge section described above. Resistivity is measured both using alternating and direct current.

The microstructure is checked on a series of samples, each about 25 mm long by 15 mm wide mounted in an epoxy resin and polished to 1 micron surface finish. These samples can be taken from a cylindrical core, typically drilled on a perpendicular through the center of the broadest face of the block so as to represent the average microstructure. Polished sections are typically prepared from regions close to the outside face of the casting as well as its core. The microstructure can be checked using both an Optical microscope and Electron Microscope. Identification of crystalline phases is done using an X-ray diffractometer. Glass phase chemistry can be defined using Energy Dispersive Spectrometry (EDS) in the electron microscope. Mean boron content of the glass phase can be estimated by difference of the total analysis from 100%. It can also be more accurately computed from data derived from bulk chemical analysis on powder obtained from the same sample—by ratio with the Silicon content determined by both EDS and bulk chemistry methods.

Resistance to thermal cycling is typically performed on samples, 25 mm in diameter by 50 mm long, taken from various locations in the casting. The samples are cycled from 1250 C to 800 C at least 20 times using a controlled heat-up and cool down rate in an electric furnace. Following this test, the change in sample volume can be measured using Water Immersion method. Also, the presence of cracks can be documented using a photograph.

Examples 4-13 were produced using the method described above. Comparative Examples 1-3 were produced using the same method. The chemical makeup of each example is listed in the table below. The electrical resistivity for each example is also provided in the table below.

| Chemistry (wt %) | 1 | 2 | 3 | 4 | 5 | 6 | 7 | 8 | 9 | 10 | 11 | 12 | 13 |
|---|---|---|---|---|---|---|---|---|---|---|---|---|---|
| Al2O3 | 1.06 | 1 | 1.11 | 1.05 | 0.95 | 0.89 | 0.9 | 1.85 | 1.61 | 1.39 | 1.12 | 0.96 | 1.09 |
| SiO2 | 4.76 | 4.36 | 5.27 | 6.63 | 5.81 | 6.07 | 5.82 | 7.91 | 7.3 | 7.06 | 6.94 | 7.18 | 8.77 |
| Fe2O3 | 0.03 | 0.03 | 0.03 | 0.035 | 0.03 | 0.03 | 0.04 | 0.04 | 0.03 | 0.03 | 0.03 | 0.03 | 0.07 |
| TiO2 | 0.1 | 0.10 | 0.10 | 0.11 | 0.11 | 0.12 | 0.12 | 0.13 | 0.14 | 0.13 | 0.13 | 0.07 | 0.08 |
| Na2O | 0.033 | 0.018 | 0.03 | 0.012 | 0.024 | 0.022 | 0.02 | 0.020 | 0.017 | 0.030 | 0.005 | 0 | 0 |
| CaO | 0.31 | 0.37 | 0.29 | 0.047 | 0.09 | 0.179 | 0.19 | 0.06 | 0.057 | 0.06 | 0.11 | 0.05 | 0.08 |
| MgO | 0.2 | 0.19 | 0.2 | 0 | 0.023 | 0.05 | 0.06 | 0 | 0 | 0 | 0 | 0 | 0 |
| B2O3 | 0.27 | 0.3 | 0.43 | 0.88 | 0.3 | 0.27 | 0.28 | 0.64 | 0.84 | 0.86 | 0.78 | 0.68 | 0.58 |
| ZrO2 | 93.2 | 93.6 | 92.5 | 91.2 | 92.7 | 92.4 | 92.6 | 89.4 | 90.0 | 90.4 | 90.9 | 91.0 | 89.3 |
| Bulk Density (g/cc) | 5.31 | 5.21 | 5.36 | 5.21 | 5.36 | 5.36 | 5.39 | 5.24 | 5.22 | 5.26 | 5.32 | 5.09 | 4.98 |
| DC Resistivity (ohm-cm) at 1625 C. | 38 | 55 | 58 | 133 | 104 | 90 | 94 | 98 | 87 | 88 | 101 | 257 | 332 |

As can be seen, from the standpoint of electrical resistivity, example 4, 12, and 13 provided the most desirable results. All of the example 4-13 achieved the desired resistivity of at least 80 ohm-cm. All of the examples were also acceptable in terms of resistance to thermal cycling.

Obviously, numerous modifications and variations of the present invention are possible. It is, therefore, to be understood that within the scope of the following claims, the invention may be practiced otherwise than as specifically described.

We claim:

1. A refractory consisting essentially of 0.96% to 1.1% $Al_2O_3$, 6.6% to 8.8% $SiO_2$, 89.3% to 91.2% $ZrO_2$, 0.6% to 0.9% $B_2O_3$, up to 0.02% $Na_2O$, up to 0.1% CaO, up to 0.1% $FeO_3$, and up to 0.1% $TiO_2$.

2. The refractory of claim 1, consisting essentially of 0.96% to 1.1% $Al_2O_3$, 6.6% to 8.8% $SiO_2$, 89.3% to 91.2% $ZrO_2$, 0.6% to 0.9% $B_2O_3$, up to 0.1% CaO, up to 0.1% $FeO_3$, and up to 0.1% $TiO_2$.

3. The refractory of claim 1, wherein the refractory has an electrical resistance of at least 250 ohm-cm at 1625° C.

4. The refractory of claim 1, wherein the refractory has an electrical resistance of at least 300 ohm-cm at 1625° C.

5. A refractory consisting essentially of 0.96% to 1.1% $Al_2O_3$, 6.6% to 8.8% $SiO_2$, 89.3% to 91.2% $ZrO_2$, 0.6% to 0.9% $B_2O_3$, up to 0.1% CaO, up to 0.1% $FeO_3$, and up to 0.1% $TiO_2$, with MgO, $P_2O_5$, and $Na_2O$ being absent.

6. The refractory of claim 5, wherein the refractory has an electrical resistance of at least 250 ohm-cm at 1625° C.

7. The refractory of claim 5, wherein the refractory has an electrical resistance of at least 300 ohm-cm at 1625° C.

8. A refractory consisting of 0.96% to 1.1% $Al_2O_3$, 6.6% to 8.8% $SiO_2$, 89.3% to 91.2% $ZrO_2$, 0.6% to 0.9% $B_2O_3$, up to 0.1% CaO, up to 0.1% $FeO_3$, and up to 0.1% $TiO_2$, with MgO, $P_2O_5$, and $Na_2O$ being absent, wherein the refractory has an electrical resistance of at least 250 ohm-cm at 1625° C.

9. The refractory of claim 8, wherein the refractory has an electrical resistance of at least 300 ohm-cm at 1625° C.

* * * * *